United States Patent
Waters et al.

(10) Patent No.: US 8,583,360 B2
(45) Date of Patent: Nov. 12, 2013

(54) USAGE MODE DETERMINATION OF NAVIGATION SYSTEM

(75) Inventors: Deric W. Waters, Dallas, TX (US); Tarkesh Pande, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 191 days.

(21) Appl. No.: 13/027,796

(22) Filed: Feb. 15, 2011

(65) Prior Publication Data
US 2011/0202754 A1 Aug. 18, 2011

Related U.S. Application Data

(60) Provisional application No. 61/304,674, filed on Feb. 15, 2010.

(51) Int. Cl.
*G06F 19/00* (2011.01)

(52) U.S. Cl.
USPC ........... 701/400; 701/120; 701/461; 701/468; 701/469; 701/470; 342/63; 342/64; 342/357.3; 342/357.31; 342/358; 340/990; 343/720; 343/725; 343/779

(58) Field of Classification Search
USPC ......... 701/120, 400, 461, 468, 469, 470, 472, 701/493, 500, 514, 531, 536; 342/63, 64, 342/357.3, 357.31, 357.24, 358, 389, 457; 340/109, 573.1, 990; 343/720, 725, 343/779
See application file for complete search history.

(56) References Cited

U.S. PATENT DOCUMENTS

| | | | | |
|---|---|---|---|---|
| 6,167,346 A | * | 12/2000 | Fukawa | 701/410 |
| 8,170,790 B2 | * | 5/2012 | Lee et al. | 701/400 |
| 2002/0147544 A1 | * | 10/2002 | Nicosia et al. | 701/207 |
| 2003/0191582 A1 | * | 10/2003 | Terada | 701/207 |
| 2005/0246078 A1 | * | 11/2005 | Vercammen | 701/23 |
| 2008/0167801 A1 | * | 7/2008 | Geelen et al. | 701/201 |
| 2009/0271109 A1 | * | 10/2009 | Lee et al. | 701/208 |
| 2011/0145331 A1 | * | 6/2011 | Christie et al. | 709/204 |
| 2012/0094693 A1 | * | 4/2012 | Murata et al. | 455/456.1 |

OTHER PUBLICATIONS

Barralon, P. "Walk Detection With a Kinematic Sensor: Frequency and Wavelet Comparison", Proceedings of the 28th IEEE EMBS Annual International Conference New York City, USA, Aug. 30-Sep. 3, 2006, ThEP3.11, 4 pages.

Shin, S.H. et al., "Adaptive Step Length Estimation Algorithm Using Low-Cost MEMS Inertial Sensors," SAS 2007—IEEE Sensors Applications Symposium, San Diego, California, Feb. 6-8, 2007, 5 pages.

Weimann, Franz et al., "Sarha—Development of a Sensor-Augmented GPS/EGNOS/Galileo Receiver for Urban and Indoor Environments" 7th Geomatic Week, Barcelona, Spain, Feb. 20-23, 2007, 11 pages.

Yi, Q. et al., "Steady-State Performance of Kalman Filter for DPLL," Tsinghua Science and Technology ISSN 1007-0214, 08/19, pp. 470-473, vol. 14, No. 4, Aug. 2009.

* cited by examiner

*Primary Examiner* — McDieunel Marc
(74) *Attorney, Agent, or Firm* — Steven A. Shaw; W. James Brady; Frederick J. Telecky, Jr.

(57) ABSTRACT

A navigation system determines its usage mode. In some embodiments, a method comprises determining a usage mode of a navigation system based on at least one of an acceleration indicator, a speed indicator, and a magnet sensor. The usage mode is at least one of a pedestrian mode, a vehicular mode, an aerial mode, a train mode, and a marine mode. The method further comprises configuring a navigation subsystem based on the usage mode.

16 Claims, 2 Drawing Sheets

USAGE MODE DETERMINATION OF NAVIGATION SYSTEM

CROSS-REFERENCE TO RELATED APPLICATION

The present application claims priority to U.S. Provisional Patent Application No. 61/304,674, filed on Feb. 15, 2010; which is hereby incorporated herein by reference.

BACKGROUND

Navigation devices are becoming ubiquitous in today's society. Many portable devices, such as smart phones, include some type of global navigation satellite system (GNSS) to determine the user's position. Such devices may be used in a variety of scenarios from a user on foot, to use in a moving vehicle, to use on an airplane, etc.

In some scenarios, the device is strapped or docked in a fixed orientation relative to the user or system (e.g., vehicle) in which the device is used. In other scenarios, the device is not strapped down or docked. The performance of the device (i.e., its ability to accurately assess its position) can be affected by its usage mode.

SUMMARY

The problems noted above are solved in large part by a navigation system that determines its usage mode. In some embodiments, a method comprises determining a usage mode of a navigation system based on at least one of an acceleration indicator, a speed indicator, and a magnet sensor. The usage mode is at least one of a pedestrian mode, a vehicular mode, an aerial mode, a train mode, and a marine mode. The method further comprises configuring a navigation subsystem based on the usage mode.

Other embodiments include a navigation system that comprises control logic and a first sensor coupled to the control logic. The sensor is at least one of a speed sensor and acceleration sensor. The control logic determines a usage mode of the navigation system based on a signal from the first sensor. The usage mode is at least one of a pedestrian mode, a vehicular mode, an aerial mode, and a marine mode.

Yet other embodiments include a navigation system that comprises control logic and a first sensor coupled to the control logic. The control logic determines a usage mode of the navigation system based on a signal from the first sensor. The usage mode is indicative of physical motion of the navigation system.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

Various speed, time, and altitude thresholds are mentioned below in terms of variables such as S1, S2, T1, T2, etc. The relative size of the thresholds have no bearing to the designators. For example, speed threshold S2 is not necessarily greater than S1. Further, two or more of the thresholds may actually be same value. For example, time threshold T4 may be equal to time threshold T2.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
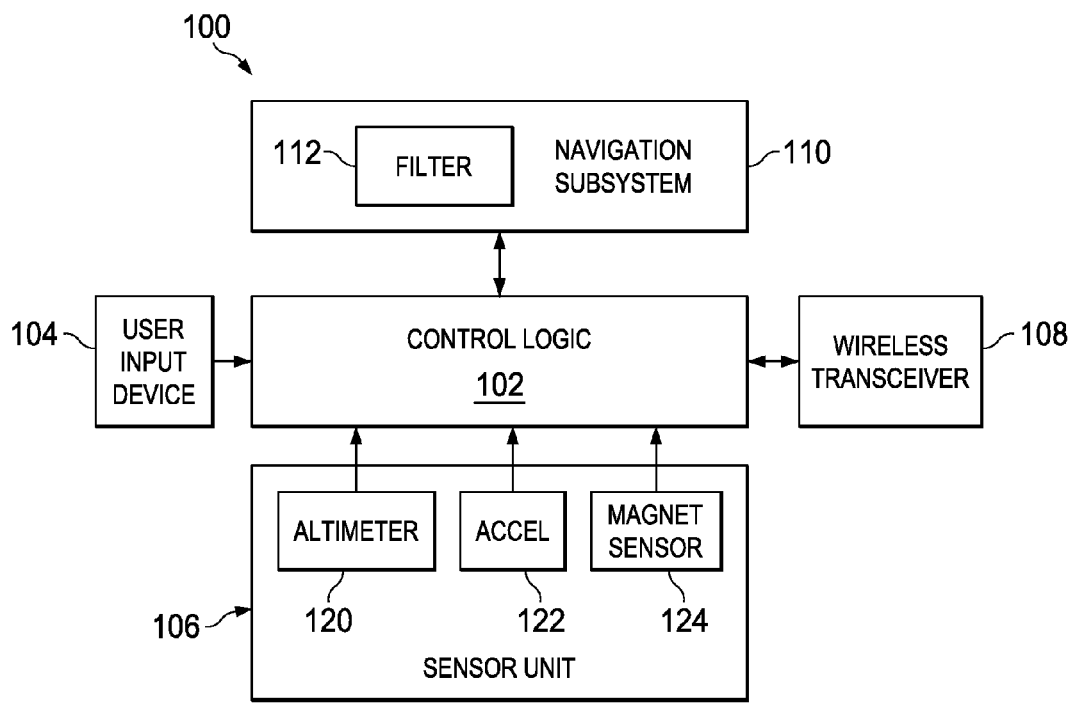
FIG. 1 shows a system in accordance with preferred embodiments of the invention.

FIG. 1 shows a navigation system 100 in accordance with various embodiments of the invention. The navigation system 100 may comprise or be implemented in a handheld device such as a smart phone or personal digital assistant (PDA) or other type of electronic device. Preferably, the navigation system 100 comprises control logic 102 coupled to a user input device 104, a sensor unit 106, a wireless transceiver 108, and a navigation subsystem 110.

Figure 2:
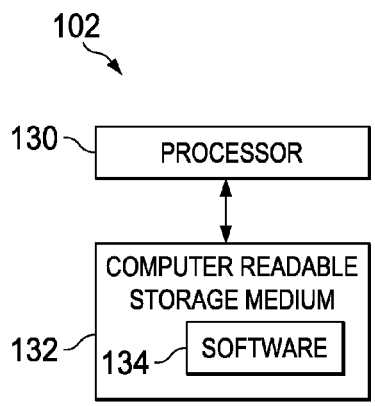
FIG. 2 illustrates an embodiment of control logic shown in the embodiment of FIG. 1.

The control logic 102 may comprise a discrete hard-wired circuit or a programmable processor. Referring briefly to FIG. 2, an illustrative embodiment of control logic 102 is shown as a processor 130 coupled to computer-readable storage medium (CRSM) 132 which contains software 134. The CRSM 132 comprises volatile storage such as random access memory, non-volatile storage such as a hard disk drive, Flash storage, read-only memory, a compact disc read-only memory (CD ROM), etc., or combinations thereof. The software 134 is executable by the processor 130. The functionality attributed herein to the control logic 102 and navigation system 100 can be performed, for example, through execution by the processor 130 of the software 134.

The navigation subsystem comprises a GNSS system such as a Global Positioning System GPS) or other type of satellite-based position determination system or a Wireless LAN based positioning system or a combination of the above.

The user input device 104 may comprise any type of input device such as a keypad, a joy stick, a mouse, a keyboard, a touchpad, etc. The wireless transceiver 108 may comprise a transceiver capable of transmitting and receiving signals in accordance with any of a variety of wireless protocols such as BlueTooth, Wi-Fi (e.g., IEEE 802.11x), wireless broadband, etc. The navigation subsystem 110 may comprise a receiver usable in accordance with any type of global navigation satellite system (GNSS) such as the global positioning system (GPS).

The sensor unit 106 comprises one or more sensors that provide signals to the control logic 102. Examples of sensors include an altimeter 120, an accelerometer 122, and a magnet sensor 124. The altimeter 120 produces a signal indicative of the altitude (e.g., above sea level) of the navigation system 100. The accelerometer 122 may be a single or multi-axis sensor that produces a signal indicative of the acceleration experienced by the navigation system. The magnet sensor 124 comprises a hall effect sensor, a magnetic impedance sensor, an electronic compass, or other type of device sensitive to a magnetic field. In some embodiments, the magnet sensor 124 asserts a signal to the control logic 102 when in the presence of a magnet such as that provided on a smart phone carrying case. The presence of a magnet in close proximity to the sensor unit (such as when the Navigation device is placed in a smart phone carrying case) results in the magnetic field intensity readings on the different axis of the magnet sensor 124 being within a prescribed range. When the magnetic field intensity readings are within a prescribed range, the navigation device can be assumed to be placed inside the smart phone carrying case.

The control logic 102 receives signals from any or all of the user input device 104, sensor unit 106, wireless transceiver 108, and navigation subsystem 110. Based on such signals, the control logic 102 determines the usage mode of the navigation system 100. The term "usage mode" refers to the physical motion of the device which the navigation system 100 is intended to track. Examples of usage modes include one or more of a slow mode, a pedestrian mode, a vehicular mode, a plane mode, a train mode, and a marine mode. Usage modes may include other modes of usage as well in addition to, or instead of, the aforementioned modes.

In a pedestrian usage mode, a user is on foot and carrying the navigation system 100 in, for example, his or her hand, in a pocket, strapped down in a carrying case on the user's belt, etc. The user may be walking, jogging, running, etc.

In a vehicular mode, the navigation system 100 is contained in or on a vehicle (e.g., a passenger car, a truck, a bus, etc.). The navigation system 100 in this mode may be, for example, strapped down to a holder contained within the car (e.g., a dock), may be held by a passenger in the vehicle or may loosely be resting on a seat.

In the plane and train modes, the navigation system 100 is contained within an airplane and train, respectively. In the marine mode, the navigation system 100 is contained within or is on a boat on a body of water such as an ocean, a lake, a river, etc. The slow mode refers to a mode in which the navigation system 100 is moving very slowly, that is, less than a threshold speed such as 2 miles per hour (MPH).

Once the control logic 102 determines the usage mode of the navigation system 100, the control logic 102 configures the navigation subsystem 110 based on the determined usage mode. In some embodiments, such as that shown in FIG. 1, the navigation subsystem 110 comprises one or more filters (e.g., a Kalman filter) and configure the navigation subsystem 100 comprises adjusting one or more parameters of the filter. For example, the Kalman filter's process noise and measurement noise can be adjusted to improve the filtered estimates of position and/or or velocity of the navigation subsystem 110 along with integrity checking of the estimates. As an example, if a user is in a pedestrian mode then the user's speed estimates may be assumed to lie within a range [0, S1]. If the speed estimates from the Kalman Filter exceed S1 then it may be determined that estimates from the Kalman Filter are incorrect and an appropriate action such as re-initializing/re-setting the Kalman Filter may be performed. This is referred to as integrity checking. Furthermore, for the pedestrian example given above, it may be assumed that the speed estimates may change by at most S1 m/s in T1 seconds. These two parameters may be used to control the loop bandwidth of the Kalman filter which is a function of the process noise. As an example, the process noise (Q) of the velocity\speed state in the Kalman Filter may be calculated as $Q=S1/T1$. See for example, "Steady-State Performance of Kalman Filter for DPLL." Q. Yi, C. Xiaowei, L. Mingquan, F. Zhenming, TSINGHUA SCIENCE AND TECHNOLOGY ISSN 1007-0214 08/19 pp 470-473, Volume 14, Number 4, August 2009, incorporated herein by reference.

In some embodiments, the navigation subsystem 110 and/or control logic 102 performs an integrity measurement process by which the integrity of the satellite measurements is checked with respect to the position fix. In some embodiments, the integrity check may comprise a receiver autonomous integrity measurement (RAIM) performed by the navigation subsystem 110 and/or control logic 102. Based on the usage mode of the navigation system 100, the control logic 102 may opt to enable or disable the integrity measurement process (e.g., enable/disable RAIM). For example, if the usage mode is plane or marine mode, the control logic may disable the RIAM process.

Some navigation systems 100 are capable of determining longitude and latitude as well as altitude (3D) although the computations involved are more complex than for 2D-only mode. If it is known a-priori that the user of the navigation system 100 is in a place where the altitude is not changing and the altitude is known apriori, then the computations can be made much easier as the apriori estimate of altitude is provided as an input to the computations and is not recomputed. Further, altimeter 120 can be powered down. For example, if the control logic determines that the user is in a vehicle on a road at a constant level (e.g., sea level), then the control logic powers down the altimeter sensor 120 and removes altitude from the computations performed by the navigation subsystem 110.

Any of a variety of techniques can be employed to determine the navigation system's usage mode. The usage mode may be determined based on at least one of an acceleration indicator and a speed indicator. In some embodiments, the acceleration indicator comprises a signal from the accelerometer 122 indicative of acceleration experienced by the navigation system 100. In other embodiments, the acceleration indicator comprises a metric computed using, at least in part, the acceleration signal from the accelerometer 122. Thus, determining the usage mode based on the acceleration indicator comprises determining the usage mode based directly or indirectly on the accelerometer signal—directly using the accelerometer signal itself or indirectly using a metric itself computed using the accelerometer signal.

The speed indicator comprises a signal or value that indicates the speed of the navigation system. In accordance with some embodiments, the speed indicator is produced using the navigation subsystem 110 in concert with the control logic 102. The navigation subsystem 110 determines the system's position and the control logic 102 keeps track of time. Using the position and time information, the control logic 102 can determine the speed of the navigation system 100.

In addition to speed and/or acceleration, the control logic 102 can determine the usage mode of the navigation system 100 based additionally or alternatively on other inputs such as a magnet (as detected by the magnet sensor 124), map data, and an indicator of altitude (e.g., from altimeter 120). Usage mode determination can also be based on a wireless signal received via the wireless transceiver 108. The following discussion describes various techniques for determining the usage mode in accordance with various embodiments of the invention.

The pedestrian usage mode is determined in some embodiments based on an analysis of the acceleration indicator. An acceleration signal, for example, has a profile over time of a pedestrian on foot. Each step the person takes causes a characteristic shape in the time progression of the acceleration signal. As such, the acceleration signal from the accelerometer can be analyzed to identify whether the characteristic profile is present indicative of a pedestrian on foot. See Weimann, Franz; Tomé, Phillip; Waegli, Adrian; Aichhorn, Klaus; Yalak, Okan; Hofmann-Wellenhof, Bernhard "SARHA—Development of a Sensor-Augmented GPS/EG-NOS/Galileo Receiver for Urban and Indoor Environments" 7th Geomatic Week, Barcelona, Spain, 20-23 Feb. 2007 as well as P. Barralon, N. Vuillerme and N. Nour, "Walk Detection With a Kinematic Sensor: Frequency and Wavelet Comparison", Proceedings of the 28th IEEE EMBS Annual International Conference New York City, USA, Aug. 30-Sep. 3, 2000, both of which are incorporated herein by reference. In some embodiments, the characteristic acceleration profile must be present for at least T! seconds or a predefined number of steps must be detected for the control logic 102 to designate the usage mode as the pedestrian mode. If the pedestrian profile in the acceleration signal is in fact present, then the control logic 102 determines that the navigation system 100 is being used in a pedestrian mode. In some embodiments, the pedestrian profile must be present for more than a threshold amount of time. If desired, speed can also be used in this assessment in that if the speed exceeds a predetermined threshold (S5), then the control logic 102 can determine that the usage mode is not the pedestrian mode regardless of the profile of the acceleration signal. The speed threshold may be, for example, at the upper speed limit of what a person is capable of moving. The speed and time thresholds, as well as all other thresholds discussed herein, may be preset or programmable by a user.

The vehicle mode can be determined based on an analysis of the speed indicator and map data combined with the navigation subsystem 110. The map data indicates the location of roads. The map data may be pre-loaded into the navigation system 100 and stored in, for example, CRSM 132. The navigation subsystem 110 indicates the position of the navigation system 100. In some embodiments, if the navigation system 100 is on a road and is moving faster than a threshold speed S1 for more than T2 seconds, then the control logic 102 determines that navigation system 100 is contained in a vehicle.

The plane mode can be determined based on an analysis of a speed indicator and either an altitude indicator or altitude velocity indicator. An altitude indicator comprises a signal produced from the altimeter 120 or a metric computed by the control logic 102 based on a signal from the altimeter 120. Altitude velocity is the rate at which altitude of the navigation system 100 changes, essentially the vertical velocity of the system 100. An airplane taking off increases its altitude at a particular rate (e.g., 50 feet per second). Many navigation subsystems 110 are capable of 2D as well as 3D modes of operation. In a 3D mode, the navigation subsystem 110 is capable of reporting its position in three dimensional space and thus its altitude can be determined. The changing altitude combined with a time progression enables the control logic 102 to determine the navigation system's altitude velocity.

If the navigation system's altitude velocity is greater than a particular threshold V1 while the forward/ground speed of the system is greater than a speed threshold S2, then the control logic 102 determines that navigation system is being used on a plane. In a plane, forward speed (relative to the ground) can be determined from or by the navigation subsystem 110. The control logic 102 also detects the presence of a plane mode if the system's speed is greater than speed threshold S2 and the altitude is greater than a threshold A1 regardless of the altitude velocity. In this latter case, for level flight the altitude velocity will be very low or zero, but the plane's speed will be greater than S3 and the altitude will be greater than A1. Either of the aforementioned conditions is identifiable by the control logic 102 as the navigation system 100 being a plane mode.

If the map data and navigation subsystem 110 indicate that the navigation system 100 is on a body of water, then the control logic 102 determines that the system is being used in marine mode. In a marine mode, the control logic 102 may configure the navigation subsystem 110 to disable the RAIM algorithm for selecting GNSS satellites.

If the map data and navigation subsystem 110 indicate that the navigation system 100 is on a train track and the speed exceeds a threshold (e.g., S3), then the control logic 102 determines that the usage mode of the navigation system 100 is a train mode. In some embodiments, time may be a factor as well. For example, train mode is determined based on the map data indicating the system is on a train track for more than T3 seconds.

If the speed of the navigation system 100 is below a relatively slow threshold S4 (e.g., 2 mph), then that information alone may cause the control logic 102 to identify the system 100 is being used in a "slow" mode. The configuration for the navigation subsystem 110 may be the same at such a slow speed regardless of whether the system is being carried by a pedestrian, in a vehicle, in a train, etc.

Figure 3:
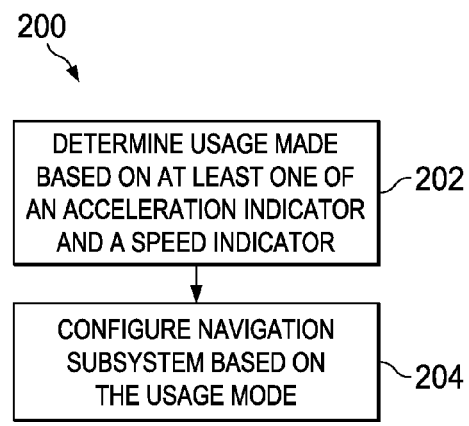
FIG. 3 shows a method in accordance with preferred embodiments of the invention.

FIG. 3 illustrates a method 200 implemented by navigation system 100. The method is controlled by the control logic 102 with assistance from other components as exemplified above. At 202, the method comprises determining the usage mode based on at least one of an acceleration indicator and a speed indicator. Other factors can be included as well in this determination as explained above. At 204, the method comprises configuring the navigation subsystem 110 based on the determined usage mode.

Figure 4:
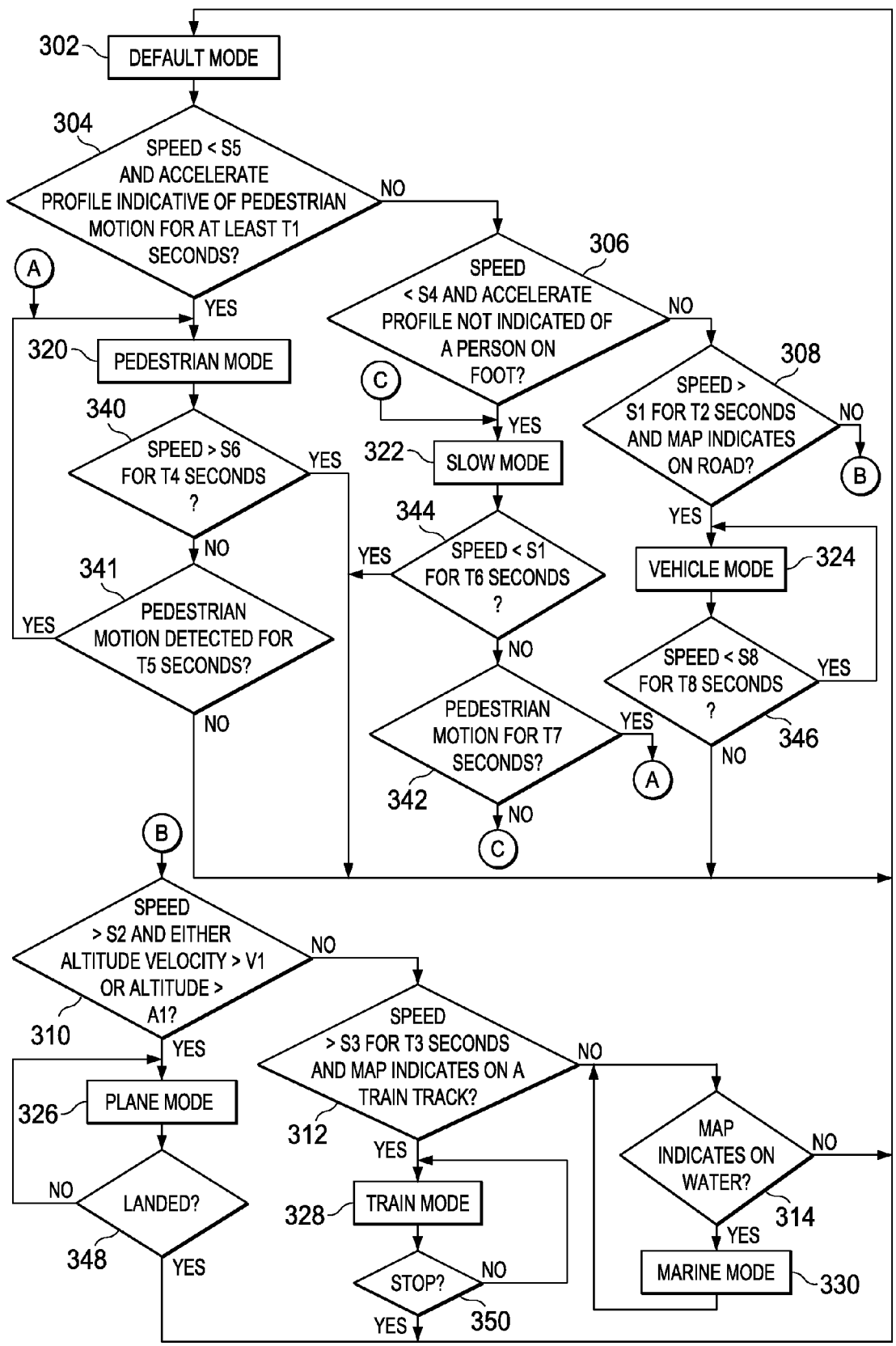
FIG. 4 depicts a more detailed embodiment of the method of FIG. 2.

FIG. 4 provides a more detailed embodiment of method 200 of FIG. 3. At 302, the navigation system is determined to be in a default usage mode with the navigation subsystem 110 configured accordingly. The default usage mode can be any desired mode. In some embodiments, the default mode is the usage mode with the highest acceleration such as the vehicle usage mode. Determination actions 304-314 ascertain, via control logic 102, the usage mode of the navigation system 100 based on various factors such as an acceleration indicator, a speed indicator, map data, etc. Once the control logic 102 determines the actual usage mode, the control logic configures the navigation subsystem 110 for the corresponding mode at 320-330 as shown. Actions 340-350 determine possible changes in the previously predetermined usage mode.

At 304, if the speed indicator is less than a threshold S5 and the acceleration profile is indicative of pedestrian motion for at least T1 seconds, then the control logic determines that the navigation system 100 is being used by a pedestrian on foot. At 320, the control logic configures the navigation subsystem 110 for the navigation mode.

At 306, if the speed indicator is less than a threshold S4 (e.g., 2 mph) and the acceleration profile is not indicative of pedestrian motion, then the control logic determines that the navigation system 100 is being used in a slow mode. At 322, the control logic configures the navigation subsystem 110 for the slow mode.

At 308, if the speed indicator is greater than a threshold S1 for at least T2 seconds and the map data indicates that the navigation system is on a road, then the control logic determines that the navigation system 100 is being used in a vehicle. At 324, the control logic configures the navigation subsystem 110 for the vehicle mode.

At 310, if the speed indicator is less than a threshold S2 and either the altitude velocity is greater than a threshold V1 or the altitude is greater than a threshold A1, then the control logic determines that the navigation system 100 is being used in an airplane. At 326, the control logic configures the navigation subsystem 110 for the plane mode.

At 312, if the speed indicator is greater than a threshold S3 and map data indicates that the navigation system is on a railroad track for more than T3 seconds, then the control logic determines that the navigation system 100 is being used by a train. At 328, the control logic configures the navigation subsystem 110 for the train mode.

At 314, if the map data indicates that the navigation system is on water (ocean, lake, etc.), then the control logic determines that the navigation system 100 is being used on a water vessel (e.g., a boat, a ship, etc.). At 330, the control logic configures the navigation subsystem 110 for the marine mode.

Once a determination 304-314 is made and the navigation subsystem 110 has been appropriately configured, the navigation subsystem remains configured for the determined usage mode unless a termination condition is detected. The termination condition for the pedestrian mode includes that the speed of the navigation system 100 exceeds a speed threshold S6 for at least T4 seconds (340) or that no pedestrian motion is detected for at least T5 seconds (341). Pedestrian motion is detected by examining the profile of the acceleration indicator and comparing it to a template indicative of pedestrian motion. If the speed is less than S6 and pedestrian motion continues to be detected, then the control logic 102 determines that the usage mode is still the pedestrian mode. If the speed is greater than S6 for at least T4 seconds (340) or no pedestrian motion is detected (341) for T5 seconds, then the control logic implements the default mode at 302 and the process repeats.

The termination condition for the slow mode is a speed that exceeds S7 for at least T6 seconds (344) or that pedestrian motion has been detected for at least T7 seconds (342). Pedestrian motion is detected by examining the profile of the acceleration indicator and comparing it to a template. If the speed is greater than S7 for at least T6 seconds (344) or pedestrian motion is detected (342) for at least T7 seconds, then the control logic implements the default mode at 302 and the process repeats. Otherwise, the navigation subsystem 110 remains configured for the slow mode.

The termination condition for the vehicle mode is a speed that is less than S8 for at least T8 seconds (346). If the speed is less than S8 for at least T8 seconds, then the control logic 102 implements the default mode at 302 and the process repeats. Otherwise, the navigation subsystem 110 remains configured for the vehicle mode.

The termination condition for the plane mode is the detection of a landing condition (348). A landing condition can be detected in some embodiments by determining the plane's speed is less than a threshold and that the plane's altitude also is less than a threshold. If a landing condition has been detected, then the control logic 102 implements the default mode at 302 and the process repeats. Otherwise, the navigation subsystem 110 remains configured for the plane mode.

The termination condition for the train mode is a speed that is zero (350). If the train has stopped, then the control logic 102 implements the default mode at 302 and the process repeats. Otherwise, the navigation subsystem 110 remains configured for the train mode.

Once in the marine mode, the control logic 102 continues to ascertain whether the navigation system 100 remains on a body of water. If not (314), then the control logic 102 implements the default mode at 302.

In the embodiments described above, the control logic 102 determines the usage mode of the navigation system directly or indirectly based on information from one or more sensors of the sensor unit 106. In other embodiments, the navigation system 100 may be in or near another system and the control logic determines the usage mode based on a wireless signal and/or information encoded in the wireless signal from such other system.

For example, the navigation system may be contained within a vehicle—strapped to an occupant's belt in a holder or sitting on a seat in the vehicle or fixed in place within the vehicle itself. The vehicle may have a wireless radio such as BlueTooth or an On Board Diagnostics (OBD) system. The navigation system 100 may associate with the vehicle's BlueTooth or OBD radios via the navigation system's wireless transceiver 108. If the control logic 102 in the navigation system 100 detects the presence of a vehicle's BlueTooth or OBD system, then the control logic 102 determines that the navigation system 100 is in a vehicle and configures the navigation subsystem 110 accordingly for vehicle mode.

By way of another example, the navigation system's wireless transceiver 108 may associate with a wireless access point on an airplane (to the extent the plane has Wi-Fi capability). Based on that association, the control logic 102 in the navigation system may determine it is on a plane and will configure the navigation subsystem 110 for plane mode.

In some usage modes, the navigation system 100 is carried by hand by a user or otherwise remains outside of a dock, holster, etc. while in other usage modes, the navigation system is docked or contained in a holster or carrying case. If the navigation system 100 is docked or contained in a holster, the control logic 102 need only estimate its orientation with respect to the user's direction of motion once. If system is not docked, it needs to continuously re-estimate or continuously track the system's orientation with respect to the users direction of motion as in the case if the system were being carried by hand whereby it may potentially change orientation frequently with respect to the user's direction of motion. Thus, a sensors assisted navigation solution will have better positioning performance in a docked scenario as compared to an undocked scenario.

In some embodiments, determining whether the navigation system 100 is docked is based on the magnet sensor 124 being in the presence of a magnet (e.g., a magnet embedded in a smart phone holder) or based on an externally received signal. An externally received may be from a docking station to which the navigation system 100 is docked. For example, a Near Field Communication mechanism may signal the navigation system (e.g., implemented in a smart phone) that the device is in fact docked.

In some embodiments, the presence of a magnet in the holster's casing is detected by the navigation system's magnet sensor 124 and communicated to the control logic 102. Additionally or alternatively, a signal may be communicated to the navigation system 100 when it is attached to a dock. That signal may be communicated to the control logic 102.

In some embodiments, the user himself may specify the usage mode to the navigation system 100 via the user input device 102. If desired, such user input of the usage mode may override and take precedent over a different usage mode otherwise determined using the sensor unit 106 or wireless transceiver. Alternatively, the control logic 102 may opt not to determine usage mode based on sensor information or wireless signals from the wireless transceiver upon receiving usage mode information input directly by the user.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   determining, by a processor, a usage mode of a navigation system based on a magnet sensor being in proximity to a magnet in a carrying case, wherein said usage mode is at least one of a strapped pedestrian mode or unstrapped pedestrian mode; and
   configuring a navigation subsystem based on said usage mode.

2. The method of claim 1 wherein determining the usage mode also comprises determining that the navigation system is strapped based on an externally received signal.

3. The method of claim 2 wherein determining the usage mode comprises determining a profile based on the acceleration indicator.

4. The method of claim 2 wherein determining the usage mode is based on a magnitude of the acceleration indicator.

5. The method of claim 2 wherein determining the usage mode is also based on a wireless signal from another device.

6. The method of claim 5 wherein the other device is a WLAN transceiver.

7. The method of claim 5 wherein the other device is a GNSS transceiver.

8. The method of claim 1 wherein determining the usage mode is based on a magnetometer measurements on each of an axis being within a prescribed range.

9. The method of claim 1 wherein the strapped pedestrian mode means that the device is inside the magnetic carrying case.

10. A navigation system, comprising:
    control logic; and
    a first sensor coupled to said control logic, said sensor being at least one of a speed sensor and acceleration sensor and a magnet sensor;
    wherein said control logic determines a usage mode of said navigation system based on a signal from said first sensor, said usage mode is at least one of a strapped pedestrian mode or an unstrapped pedestrian mode based on proximity to a carrying case having an embedded magnet.

11. The navigation system of claim 10 wherein said control logic determines the usage mode also based on a externally received wireless signal.

12. The method of claim 11 wherein the other device is a WLAN transceiver.

13. The method of claim 11 wherein the other device is a GNSS transceiver.

14. The navigation system of claim 10 wherein said control logic selectively enables and disables an integrity measurement process based on said usage mode.

15. The system of claim 10 wherein determining the usage mode is based on a magnetometer measurements on each of an axis being within a prescribed range.

16. The method of claim 10 wherein the strapped pedestrian mode means that the device is inside the magnetic carrying case.

* * * * *